(12) United States Patent
Nakao et al.

(10) Patent No.: US 12,480,677 B2
(45) Date of Patent: Nov. 25, 2025

(54) GENERATING DEVICE, SYSTEM, AND PROGRAM

(71) Applicant: DAIKIN INDUSTRIES, LTD., Osaka (JP)

(72) Inventors: Takuya Nakao, Osaka (JP); Shuji Furui, Osaka (JP); Yoshihiro Nakagawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/019,405

(22) PCT Filed: Jul. 30, 2021

(86) PCT No.: PCT/JP2021/028340
§ 371 (c)(1),
(2) Date: Feb. 2, 2023

(87) PCT Pub. No.: WO2022/030385
PCT Pub. Date: Feb. 10, 2022

(65) Prior Publication Data
US 2023/0213230 A1 Jul. 6, 2023

(30) Foreign Application Priority Data

Aug. 3, 2020 (JP) ................................ 2020-131771

(51) Int. Cl.
| F24F 11/47 | (2018.01) |
| F24F 11/48 | (2018.01) |
| G06Q 50/06 | (2024.01) |

(52) U.S. Cl.
CPC .............. *F24F 11/47* (2018.01); *F24F 11/48* (2018.01); *G06Q 50/06* (2013.01)

(58) Field of Classification Search
None
See application file for complete search history.

(56) References Cited

U.S. PATENT DOCUMENTS

| 10,558,937 | B1 | 2/2020 | Wolf et al. | |
| 2009/0234511 | A1* | 9/2009 | Ouchi | H02J 3/14 700/291 |

(Continued)

FOREIGN PATENT DOCUMENTS

| CN | 103512151 A | 1/2014 |
| CN | 106461257 A | 2/2017 |

(Continued)

OTHER PUBLICATIONS

International Search Report for PCT/JP2021/028340 (PCT/ISA/210) mailed on Sep. 21, 2021.

*Primary Examiner* — Hien D Khuu
*Assistant Examiner* — Istiaque Ahmed
(74) *Attorney, Agent, or Firm* — BIRCH, STEWART, KOLASCH & BIRCH, LLP

(57) ABSTRACT

[Object] To realize control that, in control of facility equipment, reduces electricity charges, taking into consideration fluctuation in power amount charge unit prices, and also a relation between a prediction value of power usage and a greatest value in a relevant period.
[Solution] A control device that generates control information for controlling facility equipment of a consumer includes an information acquisition unit that acquires information of a power amount charge unit price that fluctuates and information of power usage of the consumer, and a control information generating unit that, on the basis of the power amount charge unit price in an object interval that is an interval in which control of the facility equipment is performed and information of power usage of the consumer in an interval after the object interval, generates control information for the facility equipment of the consumer in the object interval.

6 Claims, 10 Drawing Sheets

(56) References Cited

U.S. PATENT DOCUMENTS

| | | | | |
|---|---|---|---|---|
| 2010/0010857 A1* | 1/2010 | Fadell | ............... | G06Q 50/06 |
| | | | | 705/412 |
| 2012/0101652 A1* | 4/2012 | Shin | ............... | H02J 3/14 |
| | | | | 700/296 |
| 2013/0204445 A1* | 8/2013 | Ikeda | ............... | H02J 3/14 |
| | | | | 700/286 |
| 2017/0104330 A1* | 4/2017 | Nakaishi | ............... | H02J 13/00 |
| 2017/0159955 A1* | 6/2017 | Kobayashi | ............... | F24F 11/48 |
| 2018/0066860 A1* | 3/2018 | Carlson | ............... | F24F 11/77 |
| 2018/0219374 A1 | 8/2018 | Pavlak et al. | | |
| 2018/0254632 A1 | 9/2018 | Elbsat et al. | | |
| 2019/0086983 A1* | 3/2019 | Sharma | ............... | H02J 4/00 |
| 2020/0301738 A1* | 9/2020 | Suzuki | ............... | G06F 1/28 |

FOREIGN PATENT DOCUMENTS

| | | | |
|---|---|---|---|
| CN | 107763799 | A | 3/2018 |
| JP | 2012-7868 | A | 1/2012 |
| JP | 2013-15922 | A | 1/2013 |
| JP | 2015-183935 | A | 10/2015 |
| JP | 2019-194504 | A | 11/2019 |
| JP | 2020-65346 | A | 4/2020 |

\* cited by examiner

| INTERVAL | 1 | 2 | 3 | 4 | 5 | 6 |
|---|---|---|---|---|---|---|
| METERED CHARGE UNIT PRICE (YEN/kWh) | 10 | 14 | 20 | 13 | 15 | 12 |
| POWER USAGE PREDICTION (kW) | 20 | 35 | 45 | 55 | 40 | 30 |
| POWER USAGE AFTER LOAD CONTROL (kW) | 20 | 45 | 35 | 50 | 45 | 25 |

| INTERVAL | 1 | 2 | 3 | 4 | 5 | 6 |
|---|---|---|---|---|---|---|
| METERED CHARGE UNIT PRICE (YEN/kWh) | 10 | 18 | 20 | 13 | 15 | 12 |
| POWER USAGE PREDICTION (kW) | 20 | 35 | 45 | 35 | 40 | 30 |
| ADJUSTMENT VALUE(kW) | – | – | –10 | +10 | – | – |
| POWER USAGE AFTER LOAD CONTROL(kW) | 20 | 35 | 35 | 45 | 40 | 30 |

| INTERVAL | 1 | 2 | 3 | 4 | 5 | 6 |
|---|---|---|---|---|---|---|
| METERED CHARGE UNIT PRICE (YEN/kWh) | 10 | 18 | 20 | 13 | 15 | 12 |
| POWER USAGE PREDICTION (kW) | 20 | 35 | 45 | 55 | 40 | 30 |
| ADJUSTMENT VALUE(kW) | – | – | ±0 | –5 | +5 | – |
| POWER USAGE AFTER LOAD CONTROL(kW) | 20 | 35 | 45 | 50 | 45 | 30 |

| INTERVAL | 1 | 2 | 3 | 4 | 5 | 6 |
|---|---|---|---|---|---|---|
| METERED CHARGE UNIT PRICE (YEN/kWh) | 10 | 8 | 20 | 13 | 15 | 12 |
| POWER USAGE PREDICTION (kW) | 20 | 30 | 45 | 45 | 40 | 30 |
| ADJUSTMENT VALUE (kW) | – | +10 | –10 | – | – | – |
| POWER USAGE AFTER LOAD CONTROL (kW) | 20 | 40 | 35 | 45 | 40 | 30 |

FIG.9A

| INTERVAL | 1 | 2 | 3 | 4 | 5 | 6 |
|---|---|---|---|---|---|---|
| METERED CHARGE (YEN/kWh) | 10 | 10 | 20 | 20 | 20 | 10 |
| AMOUNT OF POWER USAGE (kWh) | 10 | 10 | 10 | 10 | 10 | 10 |

FIG.9B

| INTERVAL | 1 | 2 | 3 | 4 | 5 | 6 |
|---|---|---|---|---|---|---|
| METERED CHARGE (YEN/kWh) | 10 | 10 | 20 | 20 | 20 | 10 |
| AMOUNT OF POWER USAGE (kWh) | 10 | 10 | 10 | 5 | 15 | 10 |

FIG.9C

| INTERVAL | 1 | 2 | 3 | 4 | 5 | 6 |
|---|---|---|---|---|---|---|
| METERED CHARGE (YEN/kWh) | 10 | 10 | 20 | 20 | 20 | 10 |
| AMOUNT OF POWER USAGE (kWh) | 10 | 15 | 5 | 10 | 5 | 15 |

GENERATING DEVICE, SYSTEM, AND PROGRAM

TECHNICAL FIELD

The present disclosure relates to a generating device, a system, and a program.

BACKGROUND ART

With respect to control for deciding a set temperature for a refrigeration device that cools inside of a warehouse so that the temperature inside of the warehouse is the set temperature, PTL 1 describes deciding the set temperature such that the set temperature is lower than a requested temperature inside the warehouse, and also daily electricity expenses of the refrigeration device are lower than daily electricity expenses when the refrigeration device is operated with the set temperature fixed, for each part of day in which electricity charges per amount of power consumed differ.

CITATION LIST

Patent Literature

PTL 1: Japanese Unexamined Patent Application Publication No. 2019-194504

SUMMARY OF INVENTION

Technical Problem

In a case in which power amount charge unit prices fluctuate, control is preferably performed to reduce amount of power usage during parts of the day when the unit prices are high, from the perspective of lowering power amount charges regarding to control of facilities and equipment that use power. Also, electricity charges include base fees that are based on contract demand, and the base fees are decided in accordance with a greatest value of average power usage (demand value) for each demand interval (hereinafter referred to simply as "interval") within a certain period. Accordingly, making sure that the demand value does not exceed the greatest value within the above certain period (hereinafter referred to as "relevant period") is required in control of facilities and equipment that use power.

Now, performing control to suppress power usage in a certain interval can in some cases result in an increase (rebound) in power usage in the interval next after, in reaction to the suppressing control in the preceding interval. When the demand value exceeds the greatest value within the relevant period, due to this temporary increase in power usage, the base fees increase.

It is an object of the present disclosure to realize control that reduces electricity charges in controlling facility equipment, taking into consideration fluctuation in power amount charge unit prices, and also a relation between a predicted value of power usage and the greatest value in the relevant period.

Solution to Problem

A generating device according to the present disclosure generates control information for controlling facility equipment of a consumer. The generating device includes a power amount charge information acquisition unit that acquires information of a power amount charge unit price that fluctuates, a power usage information acquisition unit that acquires information of power usage of the consumer, and a control information generating unit that, on the basis of the power amount charge unit price in an object interval that is an interval in which control of the facility equipment is performed and information of power usage of the consumer in an interval after the object interval, generates control information for the facility equipment of the consumer in the object interval.

Thus, the facility equipment can be controlled so as to reduce electricity charges on the basis of fluctuation in the power amount charge unit price, and also a relation between a prediction value of power usage and a greatest value in a relevant period.

Now, the control information generating unit may generate the control information to control the facility equipment so as to suppress power usage in the object interval in a case in which the power amount charge unit price in the object interval satisfies a predetermined condition.

Thus, control can be performed to reduce electricity charges by suppressing power usage of the consumer, on the basis of fluctuation in the power amount charge unit price, and also a relation between the prediction value of power usage and a greatest value in a relevant period.

Also, the control information generating unit may not generate the control information to control the facility equipment so as to suppress power usage in the object interval in a case in which the power usage of the consumer in an interval after the object interval is expected to exceed a reference power, even in a case in which the power amount charge unit price in the object interval satisfies the predetermined condition.

Thus, a situation can be avoided in which the power usage of the consumer exceeds the reference power in an interval after the object interval due to controlling the facility equipment so as to suppress power usage in the object interval.

Also, in a case in which the power usage of the consumer in an interval after the object interval is expected to exceed a reference power and in which the power amount charge unit price in an interval immediately prior to the object interval is no greater than a reference unit price, the control information generating unit may generate control information to implement preliminary operation of the facility equipment in the interval immediately prior to the object interval.

Thus, the power usage of the facility equipment in the object interval can be reduced, even in a case in which controlling the facility equipment so as to suppress power usage in the object interval will cause the power usage of the consumer to exceed the reference power in an interval after the object interval.

Also, with regard to air conditioning equipment included in the facility equipment, the control information generating unit may generate control information to implement preliminary cooling operation or preliminary heating operation in an interval immediately prior to the object interval, in accordance with operation to be implemented in an interval next after the object interval.

Thus, in an air conditioner, power usage of the air conditioner in the object interval can be reduced, even in a case in which performing control so as to suppress power usage in the object interval will cause the power usage of the consumer to exceed the reference power in an interval after the object interval.

Also, a contract charge information acquisition unit that acquires information of a contract charge unit price, which is used in conjunction with information of greatest demand power of the consumer to set a base fee may be further included. The control information generating unit may generate the control information on the basis of an electricity charge of the consumer over a certain period, which is determined from the power amount charge unit price, information of power usage of the consumer, and the contract charge unit price.

Thus, the facility equipment can be controlled to reduce the electricity charge of the consumer over the certain period.

Also, a system according to the present disclosure includes a generating device that generates control information for controlling facility equipment of a consumer, and facility equipment that accepts the control information generated by the generating device and performs action. The generating device includes a power amount charge information acquisition unit that acquires information of a power amount charge unit price that fluctuates, a power usage information acquisition unit that acquires information of power usage of the consumer, and a control information generating unit that, on the basis of the power amount charge unit price in an object interval that is an interval in which control of the facility equipment is performed and information of power usage of the consumer in an interval after the object interval, generates control information for the facility equipment of the consumer in the object interval.

Thus, the facility equipment can be controlled so as to reduce electricity charges on the basis of fluctuation in the power amount charge unit price, and also a relation between a prediction value of power usage and a greatest value in a relevant period.

Also, a program according to the present disclosure causes a computer to function as power amount charge information acquisition section that acquires information of a power amount charge unit price that fluctuates, power usage information acquisition section that acquires information of power usage of a consumer, and control information generating section that, on the basis of the power amount charge unit price in an object interval that is an interval in which control of the facility equipment of the consumer is performed and information of power usage of the consumer in an interval after the object interval, generates control information for the facility equipment of the consumer in the object interval.

According to the computer in which this program is installed, the facility equipment can be controlled so as to reduce electricity charges on the basis of fluctuation in the power amount charge unit price, and also a relation between a prediction value of power usage and a greatest value in a relevant period.

BRIEF DESCRIPTION OF DRAWINGS

FIGS. 5A and 5B are diagrams showing a relation among suppression control, adjustment control, and preliminary operation, in which FIG. 5A is a table showing control information at certain intervals, and FIG. 5B is a graph showing transition of average power usage by the facility equipment in correspondence to FIG. 5A.

FIGS. 6A and 6B are diagram showing an example of load control, in which FIG. 6A is a table showing an example of control information by interval, and FIG. 6B is a graph showing transition of average power usage by the facility equipment in correspondence to FIG. 6A.

FIGS. 7A and 7B are diagrams showing another example of load control, in which FIG. 7A is a table showing control information by interval, and FIG. 7B is a graph showing transition of average power usage by the facility equipment in correspondence to FIG. 7A.

FIGS. 8A and 8B are diagrams showing an example of load control including preliminary operation, in which FIG. 8A is a table showing control information by interval, and FIG. 8B is a graph showing transition of average power usage by the facility equipment in correspondence to FIG. 8A.

FIGS. 9A to 9C are diagrams showing a control example of control in a case in which parts of day with high power amount charge unit prices continue, in which FIG. 9A is a diagram for describing an example of a high-unit-price period, FIG. 9B is a diagram showing a control example of a case of performing control partway through the high-unit-price period, and FIG. 9C is a diagram showing a control example of a case of performing control at the beginning and the end of the high-unit-price period.

DESCRIPTION OF EMBODIMENTS

An embodiment will be described in detail below with reference to the attached drawings.

<System Configuration>

Figure 1:
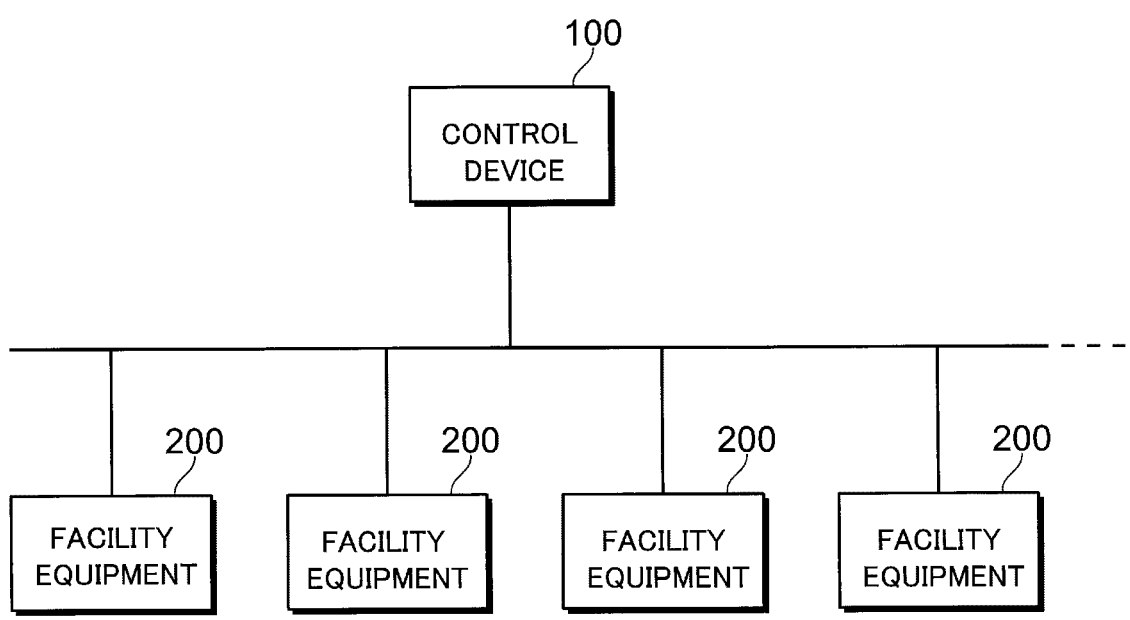
FIG. 1 is a diagram illustrating an overall configuration of a control system for facility equipment, to which the present embodiment is applied.

FIG. 1 is a diagram illustrating an overall configuration of a control system for facility equipment, to which the present embodiment is applied. The control system according to the present embodiment includes a control device 100 and facility equipment 200 that are controlled devices. The control device 100 and the facility equipment 200 are connected via a network. This network may be a LAN (Local Area Network) made up of a dedicated line, or alternatively, a VPN (Virtual Private Network) set up on a WAN (Wide Area Network) or the Internet, or the like, may be used. The facility equipment 200 are facilities and equipment that perform actions using power. The control device 100 controls actions of one or a plurality of sets of facility equipment 200. FIG. 1 illustrates a configuration example of the control device 100 controlling the plurality of sets of facility equipment 200. The facility equipment 200 performs actions using power, and the type thereof is irrelevant, as long as it is a facility or equipment of which actions are controlled by the control device 100. In the following description, description may be made in some cases regarding an example of applying the control system according to the present embodiment to control of air conditioning equipment, as a specific example of the facility equipment 200.

Also, the facility equipment 200 includes control section for controlling the facility equipment 200 in accordance with settings. The control device 100 generates control information for the facility equipment 200 that is an objects of control, and transmits the generated control information to each set of the facility equipment 200. The control device 100 is an example of a generating device. Each set of facility equipment 200 acquires the control information from the control device 100, performs settings of the facility equipment 200 by the control section in the facility equipment 200, following the control information that is acquired, and controls actions thereof <Relation Between Electricity Charges and Control of Facility Equipment 200>

Electricity charges will be described here. Electricity charges are made up primarily of base fees and power amount charges, and are determined each month. The base fees are calculated on the basis of base fee unit prices and contract demand. The contract demand is the greatest value of the greatest demand power within the past year from the current month. The greatest demand power is the greatest value of average power usage for each interval (demand interval: 30 minutes) in a month. The average power usage is an average value of demand power (power usage) in each interval. Also, power amount charges are calculated on the basis of power amount charge unit prices and amount of power usage per month.

As described above, the contract demand is the greatest value of the greatest demand power within the past year. Accordingly, once the greatest demand power for a certain month (in other words, the average power usage for a certain interval in that month) becomes the contract demand, base fees are charged for one year based on this contract demand, even if a greatest demand power lower than this contract demand continues to be maintained from that month forward. Also, once average power usage in a certain interval exceeds the value of the earlier contract demand, and becomes the greatest demand power for the month in which that interval is included, the average power usage (greatest demand power) of that interval is used for calculating base fees thereafter, as a new contract demand.

Also, there are various forms in settings for power amount charge unit prices, and settings can be made in which power amount charge unit prices fluctuate on the basis of predetermined conditions. For example, there are cases of settings being made in which power amount charge unit prices fluctuate, in accordance with, for example, the part of day within one day, whether a weekday or a holiday, the season, and so forth. Also, in a case in which power is traded on the market, and power amount charge unit prices are set that reflect the trading prices of power on the market, the power amount charge unit prices will also fluctuate by being affected by fluctuations in trading prices on the market.

There are cases regarding control of the facility equipment 200 in which control is performed directed at reducing electricity charges necessary for operation of the facility equipment 200. In this case, controlling the facility equipment 200 so that the average power usage does not exceed the current contract demand is required. Also, in a case in which power amount charge unit prices fluctuate, reducing the amount of power that is used in a part of day when the unit price is high is more efficient than in a part of day when the unit price is low, from a perspective of reducing electricity charges. However, while the power amount charge unit prices only affect the power amount charges in each interval, the contract demand affects the electricity charges for one year following the current month. Accordingly, control taking the average power usage into consideration is given priority over control taking fluctuation in the power amount charge unit prices into consideration.

Consumers, who enter into contract for power supply, are charged for the electricity charges. Consumers have one or a plurality of sets of facility equipment 200. The control device 100 controls the one or plurality of sets of facility equipment 200. The control device 100 also controls the facility equipment 200 of each consumer, in accordance with electricity charges (base fees and power amount charges) set for each consumer, taking the average power usage per interval and power amount charge unit prices into consideration. Specific contents of control of the facility equipment 200 by the control device 100 will be described later.

<Configuration of Control Device 100>

Figure 2:
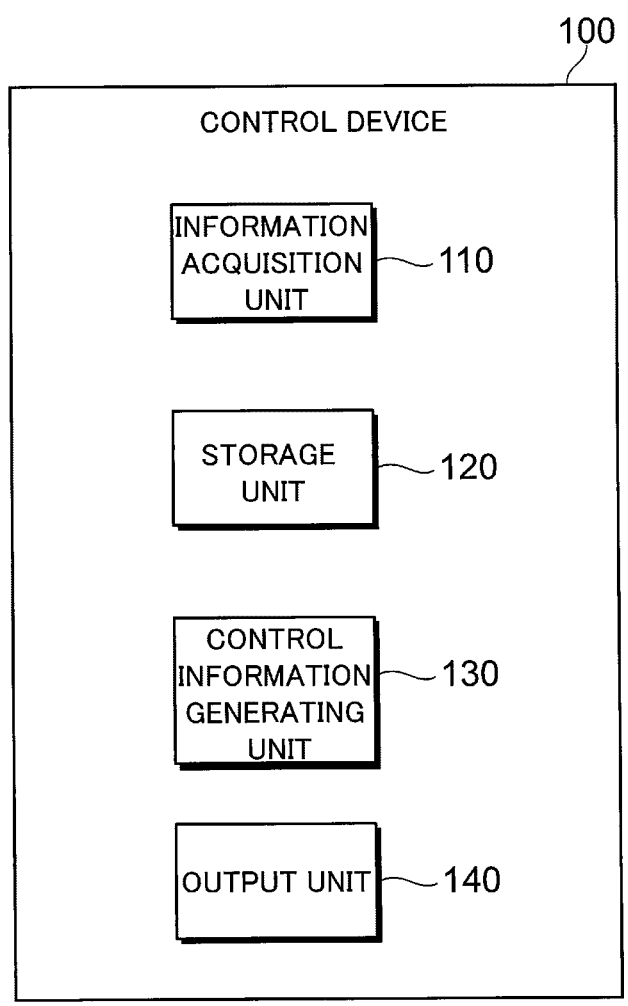
FIG. 2 is a diagram illustrating a configuration of a control device.

FIG. 2 is a diagram illustrating a configuration of the control device 100. The control device 100 includes an information acquisition unit 110, a storage unit 120, a control information generating unit 130, and an output unit 140.

The information acquisition unit 110 acquires various types of information used for generating control information for the facility equipment 200. Information that is acquired by the information acquisition unit 110 includes information of power amount charge unit prices, information relating to power usage of each consumer, and so forth. The information acquisition unit 110 is an example of a power amount charge information acquisition unit, and is an example of a power usage information acquisition unit. Contract demand, prediction information of power usage, and so forth, for example, are acquired as information relating to power usage. Prediction information of power usage is information of power usage in future intervals, predicted on the basis of history of past use of power by the consumer and so forth. Various types of existing prediction methods may be used for prediction of the power usage. For example, accumulating environment information and running information, and usage history of power, of the facility equipment 200, and predicting power usage from an environment assumed for future intervals and the running state of the facility equipment 200, is conceivable.

Examples of environment information include information of the environment where the facility equipment 200 is installed, such as temperature, humidity, and so forth. Examples of running information include information representing a state of action of the facility equipment 200, such as running rate, continuous running time, and so forth. Additionally, various types of information that conceivably would affect running of the facility equipment 200, such as the part of day of running, difference between running on weekdays and running on holidays, and so forth, can be used. The environment information and running information are acquired from sensors and so forth installed at the location where the facility equipment 200 is installed, or installed within the facility equipment 200, depending on the information that is to be acquired. Also, part of the running information is acquired from the facility equipment 200 itself. Information of the part of day of the facility equipment 200 running, and days of running, may be input by the consumer or a manager of the facility equipment 200, or may be acquired from an external server that provides date-and-time information. Different environment information and running information may be acquired as information to be used for prediction of power usage, in accordance with the type, scale, and so forth, of the facility equipment 200 that is the object of control. Various types of information are acquired via a network, using a network interface that is omitted from illustration, for example.

The storage unit 120 stores various types of information acquired by the information acquisition unit 110. The stored information is used for the control information generating unit 130 to generate control information. The storage unit 120 also stores the control information generated by the control information generating unit 130.

The control information generating unit 130 generates control information for controlling the facility equipment 200, on the basis of the information acquired by the information acquisition unit 110. In the present embodiment, the control information generating unit 130 generates control information for performing control directed at reducing electricity charges necessary to operate the facility equipment 200, in increments of intervals, on the basis of information relating to power amount charge unit prices, information relating to power usage of each consumer, and so forth. Accordingly, the control information generating unit 130 generates control information for each interval. Also, the control information generating unit 130 may generate control information based on other directivities, in addition to control information directed at reducing electricity charges. For example, control information directed at comfort of the user of the facility equipment 200 may be generated. The control information generated by the control information generating unit 130 is saved in the storage unit 120, and is sent to the facility equipment 200 that is the object of control at a predetermined timing before the interval in which the control based on the control information is to be performed (in other words, the interval that is the object of control by the control information) arrives.

The output unit 140 reads control information generated by the control information generating unit 130 out from the storage unit 120 at a predetermined timing. The control information that is read out is then output to the facility equipment 200 that is the object of control by each piece of control information via a network, using a network interface that is omitted from illustration.

Figure 3:
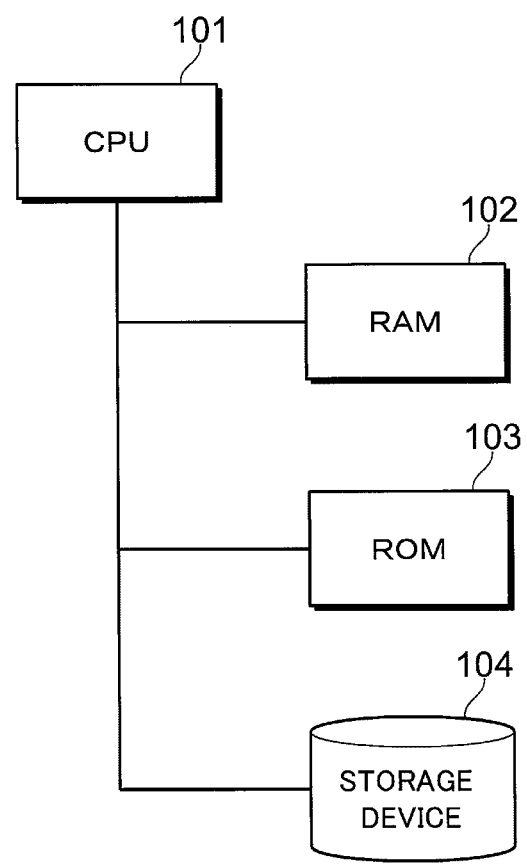
FIG. 3 is a diagram illustrating a hardware configuration example of the control device.

FIG. 3 is a diagram illustrating a hardware configuration example of the control device 100. The control device 100 is realized by a computer, for example. The computer that realizes the control device 100 includes a CPU (Central Processing Unit) 101 that is computing section, RAM (Random Access Memory) 102 and ROM (Read Only Memory) 103 that are storage section, and a storage device 104. The RAM 102 is a main memory device (main memory), and is used as work memory for the CPU 101 to perform computation processing. The ROM 103 holds programs, and data of setting values and so forth prepared in advance. The CPU 101 can read programs and data directly in from the ROM 103 and execute processing thereof. The storage device 104 is saving section for programs and data. Programs are stored in the storage device 104, and the CPU 101 reads the programs stored in the storage device 104 into the main storage device and executes the programs. The storage device 104 also stores and saves results of processing by the CPU 101. Also, the storage device 104 stores a learning model from a reinforcement learning, which is used for selecting a warehouse environment. A magnetic disk device, SSD (Solid State Drive), or the like, for example, is used as the storage device 104.

In a case in which the control device 100 is realized by the computer illustrated in FIG. 3, the functions of the information acquisition unit 110, the control information generating unit 130, and the output unit 140 described with reference to FIG. 2 are realized by the CPU 101 executing programs, for example. The storage unit 120 is realized by the RAM 102 and the storage device 104, for example. Note that the configuration example illustrated in FIG. 3 is only an example of a case of realizing the control device 100 by a computer.

<Configuration of Facility Equipment 200>

Figure 4:
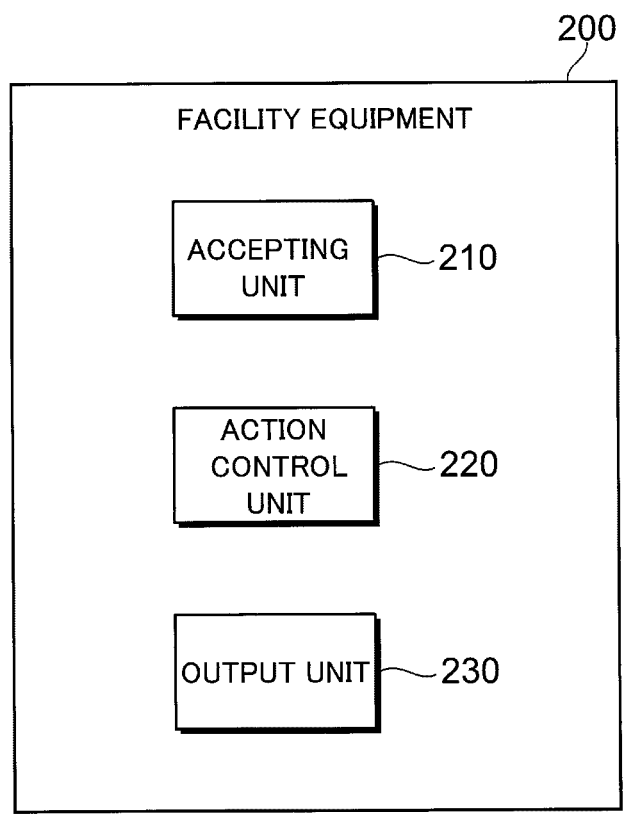
FIG. 4 is a diagram illustrating a configuration of the facility equipment.

FIG. 4 is a diagram illustrating a configuration of the facility equipment 200. The facility equipment 200 includes an accepting unit 210, an action control unit 220, and an output unit 230. Note that the facility equipment 200 has mechanisms and devices for performing actions to realize the functions of the facility equipment 200, in accordance with the type thereof. For example, in a case in which the facility equipment 200 is air conditioning equipment, the facility equipment 200 includes an indoor unit, an outdoor unit, and so forth. Also, in a case in which the facility equipment 200 is lighting facilities, the facility equipment 200 includes lighting fixtures, control switches, and so forth. The types and forms of such mechanisms and so forth are varied in accordance with the type of the facility equipment 200, and accordingly are not illustrated here.

The accepting unit 210 accepts control information output from the control device 100 via a network, using a network interface that is omitted from illustration.

The action control unit 220 controls actions of the mechanisms and devices included in the facility equipment 200, on the basis of the control information accepted by the accepting unit 210. Specifically, in a case in which the facility equipment 200 is air conditioning equipment, for example, the accepting unit 210 accepts information identifying the set temperature as the control information, and the action control unit 220 controls the actions of the indoor unit and the outdoor unit, so as to achieve a set temperature that is accepted. Although an example of control relating to temperature settings is given here, control based on control information from the action control unit 220 can be applied to other various types of control relating to gas that is controllable by air conditioning equipment (e.g., control of humidity, gas components, and so forth). The action control unit 220 in various types of facility equipment 200 other than air conditioning equipment also executes control in accordance with the type of the facility equipment 200, following control information accepted from the control device 100.

The output unit 230 outputs information relating to the state of action of the facility equipment 200 to the control device 100 via a network, using a network interface that is omitted from illustration.

The accepting unit 210, the action control unit 220, and the output unit 230 are realized by a computer, for example. The computer that realizes the action control unit 220 may have the configuration described with reference to FIG. 3. In this case, the functions of the accepting unit 210, the action control unit 220, and the output unit 230 are realized by the CPU 101 illustrated in FIG. 3 executing programs, for example. Also, the functions of the accepting unit 210, the action control unit 220, and the output unit 230 may be realized by dedicated hardware. For example, this is realized by an ASIC (Application Specific Integrated Circuit) a FPGA (Field-Programmable Gate Array), or some other circuit. Further, the accepting unit 210, the action control unit 220, and the output unit 230 may be implemented by a combination of functions realized by the CPU 101 executing programs (software) and function realized by dedicated hardware.

<Control Method of Facility Equipment 200>

Next, a control method of the facility equipment 200 will be described. As described above, the control system according to the present embodiment performs control directed at reducing electricity charges necessary for operation of the facility equipment 200. In the control directed at reducing electricity charges, control for reducing power usage by the facility equipment 200 (hereinafter referred to as "suppression control") is performed. The control contents of this suppression control normally is control that lowers the functions of the facility equipment 200. Such control reduces the comfort or convenience of the user of the facility equipment 200, depending on the type of the facility equipment 200.

Accordingly, when suppression control is performed in a certain interval, there are cases in which adjustment control is performed in the interval next after, to recover the comfort or convenience of the user. An example of this is in a case in which the facility equipment 200 is air conditioning equipment, following control for weakening the strength of cooling or heating in a certain interval being performed as suppression control, control for strengthening the strength of cooling or heating being performed in the interval next after in order to recover the comfort lost by weakening the strength of cooling or heating. This adjustment control is control for recovering the comfort or convenience of the user that is reduced due to the suppression control for reducing the power usage of the facility equipment 200, and accordingly is control that increases the power usage of the facility equipment 200, in contrast to suppression control.

Also, in a case of attempting to reduce power usage by the facility equipment 200 in a certain interval, there are cases in which preliminary operation is performed in the interval immediately prior to that interval, to relax reduction in comfort or convenience of the user. For example, in a case in which the facility equipment 200 is air conditioning equipment, and in a case in which the strength of cooling or heating is to be weakened in a certain interval to reduce power usage, there are cases in which control is performed to strengthen the strength of cooling or heating in advance in the interval immediately prior to that interval to relax loss of comfort in that interval due to the cooling or heating being weakened, or the like. More specifically, in a case in which the air conditioning equipment that is the facility equipment 200 performs cooling operation in a certain interval, a preliminary cooling operation is performed as preliminary operation in the interval immediately prior to that interval. Alternatively, a case in which the air conditioning equipment performs heating operation in a certain interval, preliminary heating operation is performed as preliminary operation in the interval immediately prior to that interval. This preliminary operation is control for relaxing reduction in the comfort or convenience of the user due to reducing the power usage of the facility equipment 200 in the following interval, and accordingly is control that increases the power usage of the facility equipment 200, in the same way as with the above adjustment control.

There can be various types of forms regarding how much to increase the power usage in the above adjustment control, depending on the specific control method and so forth corresponding to the facility equipment 200, but assumption will be made here that this increases the power usage by the same amount as the power usage reduced by the suppression control. Also, there can be various types of forms regarding how much to increase the power usage in the preliminary operation, depending on the specific control method and so forth corresponding to the facility equipment 200, but assumption will be made here that this increases the power usage by the same amount as the power usage to be reduced in the following interval.

Note that the above-described suppression control, adjustment control, preliminary operation, and load adjustment for reducing power usage following preliminary operation, each control a power load, and accordingly, in the following description, these will be collectively referred to as load control. Also, the consumer is charged for electricity charges, and accordingly in a case in which the consumer has a plurality of sets of facility equipment 200, the control contents are distributed across the sets of facility equipment 200 in order to realize the above load control by the entirety of sets of facility equipment 200. Thus, there can be cases in which one set of facility equipment 200 that the consumer has is subjected to control, for example, while another set of facility equipment 200 is not subjected to control. However, for the sake of simplicity, description will be made in the following examples that one consumer has only one set of facility equipment 200, and that the above-described load control is performed with respect to each set of facility equipment 200. Accordingly, in the following examples, the control for reducing power usage of the consumer, in order to reduce electricity charges that the consumer is charged, is load control regarding the one set of facility equipment 200 owned by that consumer.

Figures 5A, 5B:
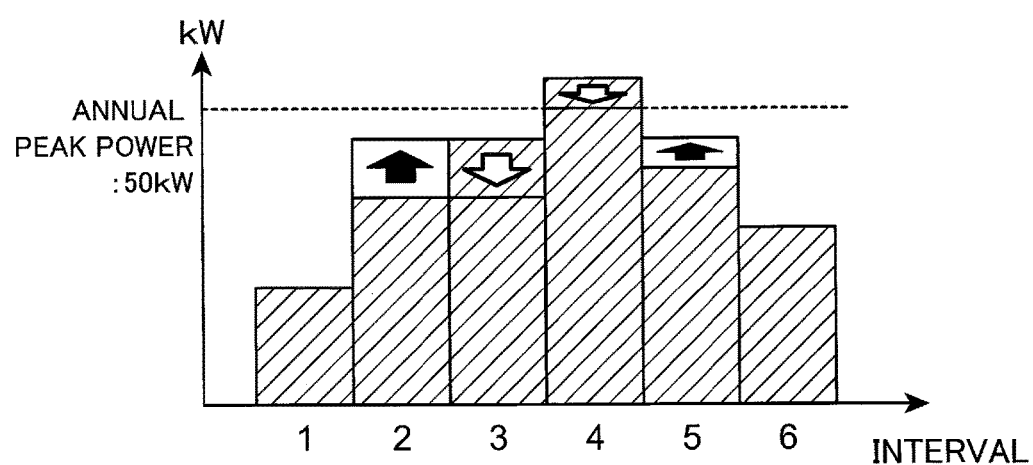

FIG. 5 is a diagram showing a relation among suppression control, adjustment control, and preliminary operation. FIG. 5A is a table showing control information at certain intervals, and FIG. 5B is a graph showing transition of average power usage by the facility equipment 200 in correspondence to FIG. 5A. Exemplified in FIG. 5A are values of the items of power amount charge unit prices (written as "metered charge unit price" in the drawings), prediction values of average power usage (written as "power usage prediction" in the drawings), and average power usage as a result of performing load control (written as "power usage after load control" in the drawings), in intervals 1 to 6. In the example shown in FIG. 5, the power amount charge unit prices are separate values for each interval. As shown in FIG. 5B, the contract demand (written as "annual peak power" in the drawings) is 50 kW (kilowatts).

The control system according to the present embodiment performs load control under the following policies.

Firstly, power usage of the facility equipment 200 is reduced in intervals in which power amount charge unit prices that fluctuate are high.

Secondly, power usage of the facility equipment 200 is controlled so that the prediction values of average power usage do not exceed the contract demand.

In FIG. 5A, focusing on the power amount charge unit prices (metered charge unit prices) in each interval, the unit price in interval 3 is the highest at 20 Yen/kWh (Yen/kilowatt-hour). Accordingly, making running of the facility equipment 200 in interval 3 to be the object of suppression control is conceivable. Also, focusing on the prediction values of average power usage (power usage prediction), interval 4 is 55 kW, which predicts that the contract demand (annual peak power) will be exceeded. Accordingly, making running of the facility equipment 200 in interval 4 to be the object of suppression control is conceivable. Also, performing at least one of adjustment control and preliminary operation, in intervals before and after intervals in which suppression control is performed, is conceivable. In the example shown in FIG. 5, preliminary operation is performed in interval 2 immediately prior to interval 3 in which suppression control is performed, and adjustment control is performed in interval 5 immediately following interval 4 in which suppression control is performed, in the same way. Load control based on the above control policies will be described below by way of specific examples.

(Load Control Based on First Policy)

Figures 6A, 6B:
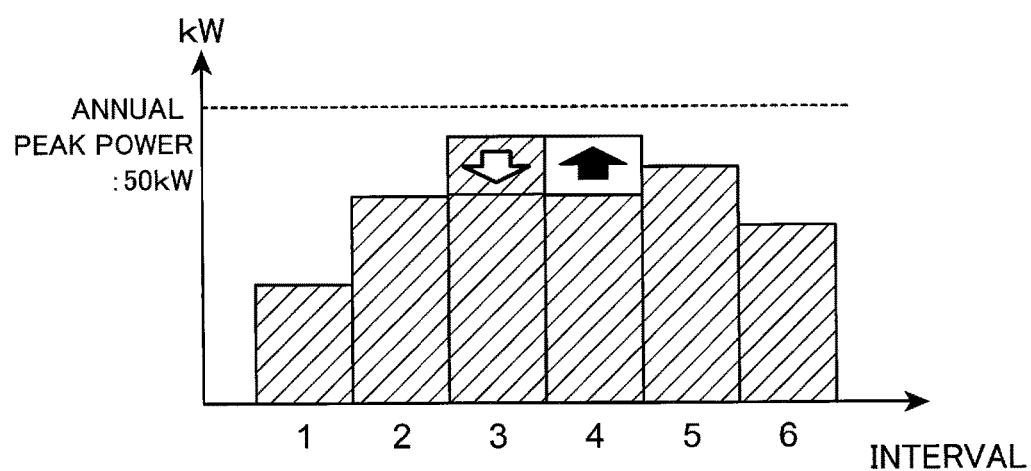

FIGS. 6A and 6B are diagrams showing an example of load control. FIG. 6A is a table showing an example of control information by interval, and FIG. 6B is a graph showing transition of average power usage by the facility equipment 200 in correspondence to FIG. 6A. Exemplified in FIG. 6A are values of the items of power amount charge unit prices (metered charge unit prices), prediction values of average power usage (power usage prediction), adjustment values in load control, and average power usage as a result of performing load control (power usage after load control), in intervals 1 to 6. In the example shown in FIGS. 6A and 6B, the power amount charge unit price fluctuates in increments of intervals, and is 10 Yen/kWh in interval 1, 18 Yen/kWh in interval 2, 20 Yen/kWh in interval 3, 13 Yen/kWh in interval 4, 15 Yen/kWh in interval 5, and 12 Yen/kWh in interval 6. Also, the power usage predicted for each interval is 20 kW in interval 1, 35 kW in interval 2, 45 kW in interval 3, 35 kW in interval 4, 40 kW in interval 5, and 30 kW in interval 6. Also, the contract demand (annual peak power) is 50 kW, as shown in FIG. 6B.

In FIGS. 6A and 6B, focusing on the power amount charge unit prices, interval 3 is the highest at 20 Yen/kWh. Accordingly, the control system performs suppression control with respect to running of the facility equipment 200 in interval 3. Also, in accordance with the suppression control, adjustment control is performed with respect to running of the facility equipment 200 in interval 4 immediately following interval 3. As shown in FIG. 6A, the control system controls the facility equipment 200 so as to reduce the prediction value of average power usage from 45 kW by 10 kW to 35 kW in the suppression control in interval 3. On the other hand, in the adjustment control in interval 4, the facility equipment 200 is controlled so as to increase the prediction value of average power usage from 35 kW by 10 kW to 45 kW. Now, the predicted power usage does not exceed the contract demand 50 kW in interval 4 even when adjustment control is performed. Accordingly, suppression control may be performed in interval 3, and adjustment control may be performed in interval 4.

In the load control shown in FIGS. 6A and 6B, the average power usage is increased for running of the facility equipment 200 in interval 4 by an amount equal to that of reducing the average power usage for running of the facility equipment 200 in interval 3. Accordingly, the total of average power usage in interval 3 and interval 4 is the same as a case in which no load control is performed. However, the power amount charge unit price is 20 Yen/kWh in interval 3, and the power amount charge unit price is 13 Yen/kWh in interval 4, and accordingly, on the basis of this difference in power amount charge unit prices, the power amount charges charged for running the facility equipment 200 are lower due to performing the load control.

Now, the strength of the load control described with reference to FIGS. 6A and 6B will be described. In suppression control, control is performed that lowers the functions of the facility equipment 200. In this case, if the strength of control (the degree of lowering the functions of the facility equipment 200) is strong, the comfort and convenience of using the facility equipment 200 is markedly reduced. Accordingly, an arrangement is conceivable in which a threshold value is set in advance for the strength of control, on the basis of a range in which users can tolerate reduction in comfort and convenience, and suppression control is performed within a range that does not exceed this threshold value. For example, in a case in which the facility equipment 200 is air conditioning equipment, a threshold value of ±3° C. may be set with respect to a temperature that is a comfortable temperature, and suppression control may be performed such that the facility equipment 200 is operated within this range. Also, an arrangement can be conceived in which instead of deciding a threshold value in advance, the strength of control is dynamically decided in accordance with a tradeoff between reduced comfort and convenience due to performing suppression control, and the amount of reduction in electricity charges. For example, execution conditions may be set such that suppression control is executed if monthly electricity charges can be reduced by a certain monetary amount or more.

Adjustment control is control for recovering from reduced comfort and convenience due to suppression control, and accordingly performing control within a range that does not exceed the width of adjustment in suppression control is conceivable. In the example shown in FIG. 6A, the average power usage is increased as to the prediction value in adjustment control by a value the same as the value of reducing the average power usage as to the prediction value in suppression control, as shown in the adjustment value item. Conversely, adjustment control may be performed such that the power increase is a smaller value than the adjustment value in suppression control.

Figures 7A, 7B:
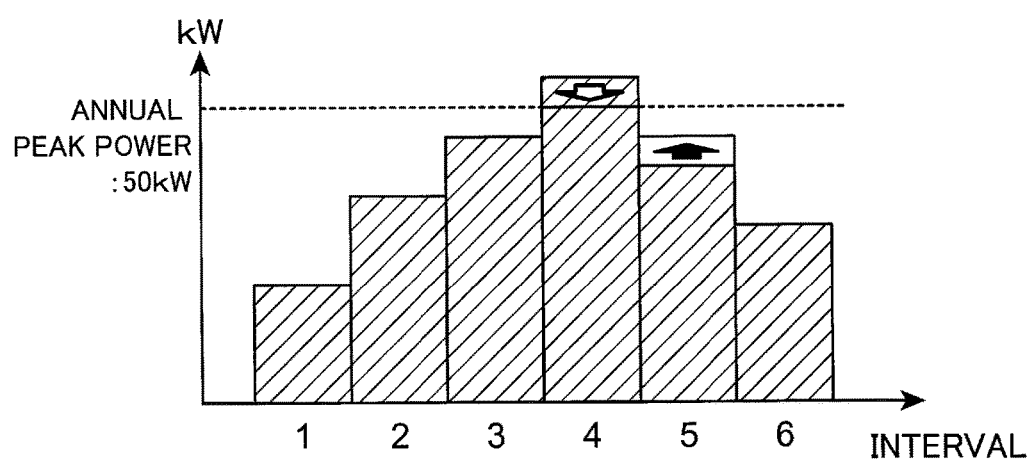

FIGS. 7A and 7B are diagrams showing another example of load control. FIG. 7A is a table showing control information by interval, and FIG. 7B is a graph showing transition of average power usage by the facility equipment 200 in correspondence to FIG. 7A. Exemplified in FIG. 7A are values of the items of power amount charge unit prices (metered charge unit prices), prediction values of average power usage (power usage prediction), adjustment values in load control, and average power usage as a result of performing load control (power usage after load control), in intervals 1 to 6. In the example shown in FIGS. 7A and 7B, the power amount charge unit price fluctuates in increments of intervals, and is 10 Yen/kWh in interval 1, 18 Yen/kWh in interval 2, 20 Yen/kWh in interval 3, 13 Yen/kWh in interval 4, 15 Yen/kWh in interval 5, and 12 Yen/kWh in interval 6. Also, the power usage predicted for each interval is 20 kW in interval 1, 35 kW in interval 2, 45 kW in interval 3, 55 kW in interval 4, 40 kW in interval 5, and 30 kW in interval 6. Also, the contract demand (annual peak power) is 50 kW, as shown in FIG. 7B.

In FIGS. 7A and 7B, focusing on the power amount charge unit prices, interval 3 is the highest at 20 Yen/kWh, in the same way as in the example in FIGS. 6A and 6B. Also, focusing on the predicted power usage, the prediction value is 55 kW in interval 4, which exceeds the 50 kW of the contract demand. Accordingly, performing suppression control in interval 3 and performing adjustment control in interval 4, the power usage in interval 4 following the control will exceed the contract demand (annual peak power), and thus increase the base fees in the electricity charges. Accordingly, as shown in the example in FIGS. 7A and 7B, in a case in which performing suppression control in a certain interval (interval 3 here) and performing adjustment control in an interval after that interval (interval 4 here) will cause the prediction value of average power usage to exceed the contract demand, the control system does not perform suppression control. In FIG. 7A, the adjustment value of the load in interval 3 is ±0, indicating that neither control to decrease the average power usage, nor control for increase thereof, is performed.

Note that in the example shown in FIGS. 7A and 7B, the prediction value of the average power usage exceeds the value of the contract demand in interval 4. Conversely, even in a case in which the prediction value of the average power usage itself in interval 4 is no greater than the contract demand, suppression control in container 3 is omitted in the same way as above, in a case in which performing adjustment control will cause the average power usage to exceed the value of the contract demand. In this case, a reference value (reference power) of a value smaller than the contract demand may be set, for example, and the suppression control in interval 3 may be omitted in a case in which the prediction value of average power usage in interval 4 is greater than the reference value.

Next, load control that includes preliminary operation will be described. In the example shown in FIGS. 7A and 7B, in a case in which performing suppression control in a certain interval (hereinafter referred to as "interval of interest") and performing adjustment control in a later interval will cause the prediction value of power usage to exceed the contract demand in the later interval, suppression control is not performed in the interval of interest. Conversely, in a case of reducing power usage of the facility equipment 200 in the interval of interest even in such a situation, performing preliminary operation in an interval earlier than the interval of interest is conceivable.

Figures 8A, 8B:
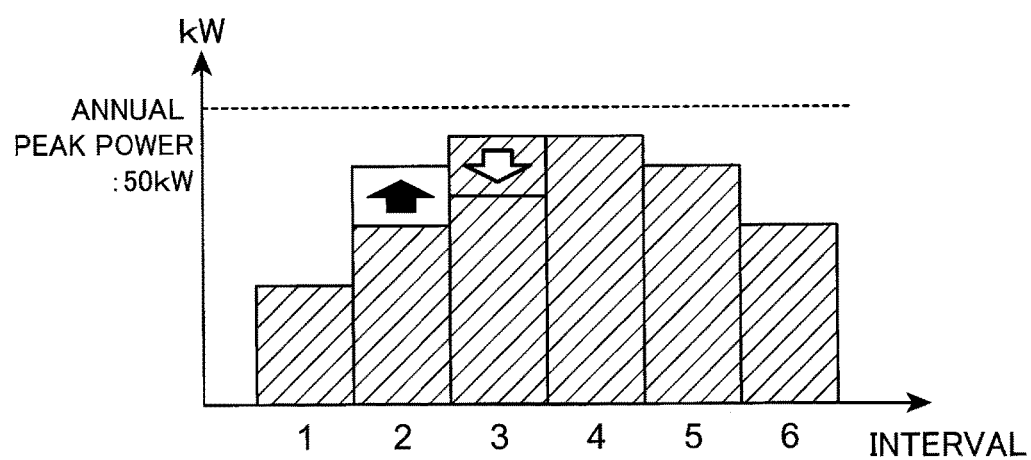

FIGS. 8A and 8B are diagrams showing an example of load control including preliminary operation. FIG. 8A is a table showing control information by interval, and FIG. 8B is a graph showing transition of average power usage by the facility equipment 200 in correspondence to FIG. 8A. Exemplified in FIG. 8A are values of the items of power amount charge unit prices (metered charge unit prices), prediction values of average power usage (power usage prediction), adjustment values in load control, and average power usage as a result of performing load control (power usage after load control), in intervals 1 to 6. In the example shown in FIGS. 8A and 8B, the power amount charge unit price fluctuates in increments of intervals, and is 10 Yen/kWh in interval 1, 8 Yen/kWh in interval 2, 20 Yen/kWh in interval 3, 13 Yen/kWh in interval 4, 15 Yen/kWh in interval 5, and 12 Yen/kWh in interval 6. Also, the power usage predicted for each interval is 20 kW in interval 1, 30 kW in interval 2, 45 kW in interval 3, 45 kW in interval 4, 40 kW in interval 5, and 30 kW in interval 6. Also, the contract demand (annual peak power) is 50 kW, as shown in FIG. 8B. Also in this example, the reference value for determining that there is a possibility of the average power usage exceeding the contract demand in a case of performing load control is 45 kW.

In FIG. 8, focusing on the power amount charge unit prices, interval 3 is the highest at 20 Yen/kWh. Also, focusing on the predicted power usage, the prediction value is 45 kW in interval 4, which matches the above-described reference value. Accordingly, determination is made that performing suppression control in interval 3 and performing adjustment control in interval 4 will cause the power usage of the facility equipment 200 to exceed the contract demand (annual peak power) in interval 4 following the control, which would increase the base fees in the electricity charges. Accordingly, the control system does not perform suppression control in interval 3, in the same way as in the example described with reference to FIGS. 7A and 7B.

Now, focusing on interval 2 immediately prior to interval 3, the power amount charge unit price in interval 2 is 8 Yen/kWh, which is lower than in interval 3. Also, the predicted power usage is 30 kW, which is smaller than the above reference value, and accordingly determination is made that even if the power usage of the facility equipment 200 is increased by load control, the power usage of the facility equipment 200 in interval 4 will not exceed the contract demand. Thus, the control system performs preliminary operation in interval 2. Also, control for reducing the power usage of the facility equipment 200 is performed in interval 3 immediately following interval 2, as load adjustment in conjunction with the preliminary operation.

As shown in FIG. 8A, the control system controls the facility equipment 200 in preliminary operation in interval 2 so that the average power usage is increased from the prediction value of 30 kW by 10 kW to 40 kW. On the other hand, the control system controls the facility equipment 200 in load adjustment in interval 3 so that the average power usage is reduced from the prediction value of 45 kW by 10 kW to 35 kW. Note that while the power amount charge unit price in interval 2 being lower than the power amount charge unit price in interval 3 is described as being one condition for performing preliminary operation here, determination may be made to perform preliminary operation in a case in which the unit price is lower than a unit price set in advance (reference unit price).

In the load control shown in FIGS. 8A and 8B, the average power usage is increased for running of the facility equipment 200 in interval 2 by an amount equal to that of reducing the average power usage for running of the facility equipment 200 in interval 3. Accordingly, the total of average power usage in interval 3 and interval 2 is the same as a case in which no load control is performed. However, the power amount charge unit price is 20 Yen/kWh in interval 3, and the power amount charge unit price is 8 Yen/kWh in interval 2, and on the basis of this difference in power amount charge unit prices, the power amount charges charged for running the facility equipment 200 are lower due to performing the load control.

Now, the strength of the load control described with reference to FIGS. 8A and 8B will be described. As described above, in intervals in which preliminary operation is performed, the control system controls actions of the facility equipment 200 so that the power usage is greater than the prediction value. Accordingly, there are cases in which comfort and convenience of using the facility equipment 200 are reduced. For example, in a case in which the facility equipment 200 is air conditioning equipment, the temperature planned for that interval and the temperature in a case of performing a preliminary cooling operation or a preliminary heating operation will diverge. Accordingly, an arrangement is conceivable in which a threshold value is set in advance for the strength of control, on the basis of a range in which users can tolerate reduction in comfort and convenience, and preliminary operation is performed within a range that does not exceed this threshold value. For example, in a case in which the facility equipment 200 is air conditioning equipment, a threshold value of ±3° C. may be set with respect to a temperature that is a comfortable temperature, and preliminary operation may be performed such that the facility equipment 200 is operated within this range. Also, an arrangement can be conceived in which instead of deciding a threshold value in advance, the strength of control is dynamically decided in accordance with a tradeoff between reduced comfort and convenience due to performing preliminary operation, and the amount of reduction in electricity charges. For example, execution conditions may be set such that preliminary operation is performed if monthly electricity charges can be reduced by a certain monetary amount or more.

In a case of performing load adjustment in an interval following the interval in which preliminary operation is performed, the strength of control may be set in the same way as the example of suppression control described with reference to FIGS. 6A and 6B. In this case, preliminary operation is performed in advance, and accordingly even if control of strength the same as the suppression control in FIGS. 6A and 6B is performed, reduction in comfort and convenience of the user is reduced as compared to the case of performing suppression control in FIGS. 6A and 6B.

(Load Control Based on Second Policy)

Referencing FIGS. 7A and 7B again, focusing on the prediction value for the average power usage in interval 4 in the example shown in FIGS. 7A and 7B, the prediction value at the point prior to performing load control exceeds the contract demand. Accordingly, there is a possibility that the base fees in the electricity charges will increase if the facility equipment 200 continues to be operated in this state. Accordingly, the control system performs suppression control with respect to running of the facility equipment 200 in interval 4. Adjustment control is also performed with respect to running of the facility equipment 200 in interval 5 immediately following interval 4, in accordance with this suppression control. As shown in FIG. 7A, the control system controls the facility equipment 200 so that the average power usage is reduced from the prediction value of 55 kW by 5 kW to 50 kW in the suppression control in interval 4. On the other hand, the facility equipment 200 is controlled so that the average power usage is increased from the prediction value of 40 kW by 5 kW to 45 kW in the adjustment control in interval 5. Now, the predicted power usage in interval 4 is no greater than 50 kW, which is the contract demand, due to performing suppression control. Also, the predicted power usage in interval 5 does not exceed the contract demand 50 kW even if adjustment control is performed. Accordingly, the base fees in the electricity charges will not increase if the facility equipment 200 is operated in accordance with this control. Therefore, suppression control may be performed in interval 4, and adjustment control may be performed in interval 5.

Now, the strength of the load control described with reference to FIGS. 7A and 7B will be described. The suppression control shown in the example in FIGS. 7A and 7B aims to keep the average power usage from exceeding the contract demand. Accordingly, the control system performs suppression control at a strength such that the average power usage following control is no greater than the contract demand. The adjustment control is performed such that the range of control does not exceed the width of adjustment in suppression control, in the same way as with the example shown in FIGS. 6A and 6B. In the example shown in FIG. 7A, the average power usage is increased as to the prediction value in adjustment control by a value the same as the value of reducing the average power usage as to the prediction value in suppression control, as shown in the adjustment value item. Conversely, load control may be performed such that the value in adjustment control is a smaller value than the adjustment value in suppression control.

(Control in Case of Intervals with High Power Amount Charge Unit Prices Continuing)

In the present embodiment, a case in which electricity charge unit prices fluctuate in accordance with the part of day, suppression control is performed at the parts of day in which unit prices are high, such that the facility equipment 200 performs actions that reduce power usage, thereby efficiently reducing electricity charges charged with respect to the facility equipment 200 running. Also, adjustment control and preliminary operation that increase power usage are performed, to relax reduction in functions of the facility equipment 200 based on the suppression control.

Now, a case in which parts of day in which the power amount charge unit prices are high continue will be considered. In this case, when suppression control is performed partway through parts of day in which the unit prices are high, the power amount charge unit prices are also high at the timing of performing adjustment control following the suppression control, and accordingly the electricity charges cannot be reduced efficiently. Accordingly, in such a case it is conceivable to perform suppression control at the end of a period where parts of day in which the power amount charge unit prices are high continue (hereinafter referred to as "high-unit-price period"), and to perform adjustment control at the following part of day. Also, performing preliminary operation immediately prior to the high-unit-price-continuation period is conceivable.

FIGS. 9A to 9C are diagrams showing an example of control in a case in which parts of day with high power amount charge unit prices continue. FIG. 9A is a diagram for describing an example of a high-unit-price period, FIG. 9B is a diagram showing a control example of a case of performing control partway through the high-unit-price period, and FIG. 9C is a diagram showing a control example of a case of performing control at the beginning and the end of the high-unit-price period. Shown in the drawings are the power amount charge unit prices (metered charges) and the amount of power usage, for continuous intervals 1 to 6.

In the example shown in FIG. 9A, the power amount charge unit prices (metered charges) are 10 Yen/kWh for intervals 1, 2, and 6 out of the continuous intervals 1 to 6, and 20 Yen/kWh for intervals 3, 4, and 5. Accordingly, the intervals 3, 4, and 5 are a high-unit-price period. Also, in the example shown in FIG. 9A, the amount of power usage is 10 kWh for all of the intervals 1 to 6. Accordingly, in the example shown in FIG. 9A, the total of power amount charges for intervals 1 to 6 is as follows.

900 Yen=10 Yen/kWh×10 kWh (interval 1)+10 Yen/kWh×10 kWh (interval 2)+20 Yen/kWh×10 kWh (interval 3)+20 Yen/kWh×10 kWh (interval 4)+20 Yen/kWh×10 kWh (interval 5)+10 Yen/kWh×10 kWh (interval 6)

In FIG. 9B, suppression control is performed in interval 4 that is a timing partway through the high-unit-price period (see solid-line frame in the drawing). In this example that is shown in the drawing, the amount of power usage is 5 kWh in interval 4, which is a reduction by 5 kWh in comparison with the amount of power usage in interval 4 in FIG. 9A. Also, in the example shown in FIG. 9B, adjustment control is performed in interval 5 immediately following interval 4 (see dashed-line frame in the drawing). In this example that is shown in the drawing, the power usage is 15 kWh in interval 5, which is an increase by 5 kWh in comparison with the amount of power usage in interval 5 in FIG. 9A. Accordingly, the total of the amount of power usage in intervals 1 to 6 is the same as with the example in FIG. 9A. Also, the power amount charge unit price is 20 Yen/kWh for both interval 4 and interval 5. Accordingly, in the example shown in FIG. 9B, the total of power amount charges for intervals 1 to 6 is 900 Yen=10 Yen/kWh×10 kWh (interval 1)+10 Yen/kWh×10 kWh (interval 2)+20 Yen/kWh×10 kWh (interval 3)+20 Yen/kWh×5 kWh (interval 4)+20 Yen/kWh×15 kWh (interval 5)+10 Yen/kWh×10 kWh (interval 6)

and is unchanged from the example in FIG. 9A.

In FIG. 9C, suppression control is performed in interval 5 that is the end of the high-unit-price period (see solid-line frame in the drawing), and adjustment control is performed in interval 6 immediately following interval 5 (see dashed-line frame in the drawing). Also, preliminary operation is performed in interval 2 that is immediately prior to the high-unit-price period beginning (see single-dot chain line frame in the drawing), and load adjustment based on the preliminary operation is performed in interval 3 that is the beginning of the high-unit-price period (see continuous line frame in the drawing). In this example that is shown in the drawing, the amount of power usage is 5 kWh in both interval 3 and interval 5, which is a reduction by 5 kWh in comparison with the amount of power usage in intervals 3 and 5 in FIG. 9A. Also, in this example that is shown in the drawing, the power usage is 15 kWh in both interval 6 and interval 2, which is an increase by 5 kWh in comparison with the amount of power usage in interval 6 and interval 2 in FIG. 9A. Accordingly, the total of the amount of power usage in intervals 1 to 6 is the same as with the example in FIG. 9A. However, while the power amount charge unit price is 20 Yen/kWh for interval 3 and interval 5, the power amount charge unit price is 10 Yen/kWh for interval 2 and interval 6. Accordingly, in the example shown in FIG. 9C, the total of power amount charges for intervals 1 to 6 is > 800 Yen=10 Yen/kWh×10 kWh (interval 1)+10 Yen/kWh×15 kWh (interval 2)+20 Yen/kWh×5 kWh (interval 3)+20 Yen/kWh×10 kWh (interval 4)+20 Yen/kWh×5 kWh (interval 5)+10 Yen/kWh×15 kWh (interval 6)

and is less expensive than in the example in FIG. 9A. Note that in a case in which only one of the suppression control in interval 5 and the adjustment control in interval 6, and the preliminary operation in interval 2 and the load adjustment in interval 3 is performed, the total of power amount charges for intervals 1 to 6 is 850 Yen, which is less expensive than in the example in FIG. 9A.

<Other Control Conditions>

Out of the load controls above, the load adjustment following suppression control and preliminary operation are basically performed with respect to one interval. The reason is that performing these with respect to a plurality of continuous intervals excessively lowers the functions of the facility equipment 200, causing marked reduction in the comfort and convenience of using the facility equipment 200. Also, adjustment control and preliminary operation are basically performed with respect to one interval. The reason is that these controls are controls for recovering or relaxing reduced comfort and convenience of users due to suppression control and so forth, and there is no need to continuously execute these over a plurality of intervals.

Note however, that in the load control based on the second policy described with reference to FIGS. 7A and 7B, in a case in which a plurality of intervals in which the prediction values of power usage exceeds the contract demand continue, suppression control is performed with respect to all such intervals. In other words, suppression control is executed consecutively over a plurality of intervals. This is because if there is even one interval in which the power usage exceeds the contract demand, the value of that power usage exceeding the contract demand becomes the new contract demand, and will be used for calculating the base fees.

Note that in the load controls above, determination is made for each interval with regard to whether or not the power amount charges are high compared to other intervals, whether or not there is a possibility of the power usage exceeding the contract demand (or reference value), and whether or not to execute load control is decided. Conversely, an arrangement may be made in which electricity charges are calculated regarding a case of performing load control and a case of not performing load control over a certain object period (e.g., one month) for each consumer, on the basis of power amount charge unit prices, information of power usage of the consumer, information of contract charge unit prices of the consumer, and so forth, and load control is performed in a case in which performing load control can reduce electricity charges.

<Acquiring Power Amount Charge Unit Prices>

In the present embodiment, the facility equipment 200 is controlled to reduce power usage at timings in which power amount charge unit prices are high, thereby reducing electricity charges charged regarding running of the facility equipment 200, taking advantage of the fact that the power amount charge unit prices fluctuate. Such a control method is more effective with regard to power amount charge unit prices that fluctuate in short time spans, and an example of a case in which the electricity charge unit prices fluctuate in increments of demand intervals is described in the examples described with reference to FIG. 5 to FIGS. 8A and 8B. An example of power amount charge unit prices fluctuating in short time spans like intervals is a case in which power amount charge unit prices are set to reflect trading prices on power markets. In this case, the timings of finalization of power amount charge unit prices are determined in accordance with the timings at which the power markets are open.

Figure 10:
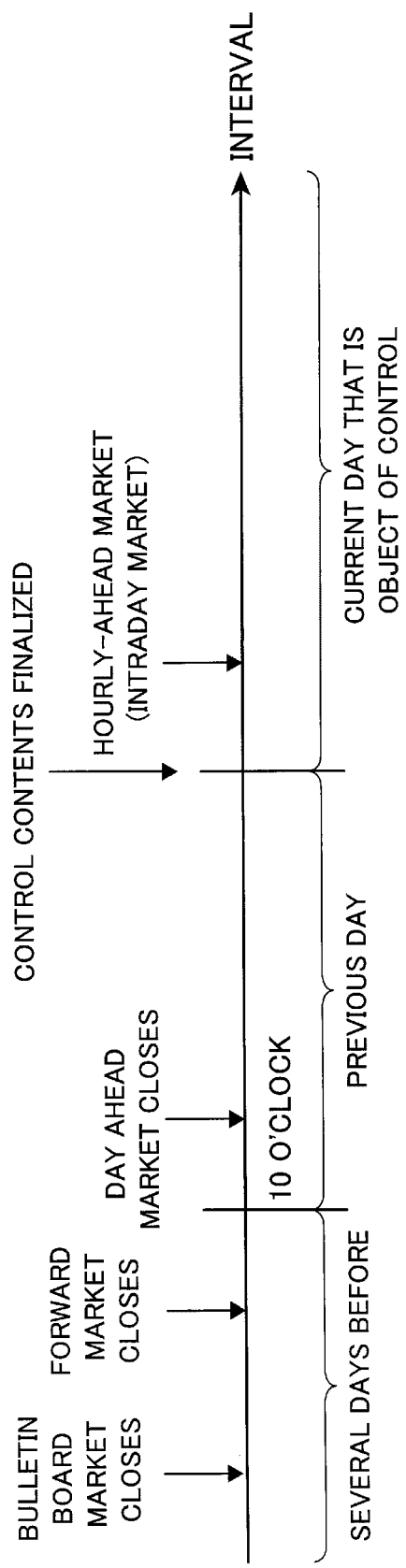
FIG. 10 is a diagram showing a relation between power markets and timings at which power amount charge unit prices are finalized.

FIG. 10 is a diagram showing a relation between power markets and timing at which power amount charge unit prices are finalized. There are four types of markets in the power market in accordance with the trading timings, which are forward market, bulletin board market, day ahead market, (spot market), and hourly-ahead market (intraday market). Power that is used in a day in which an interval that is the object of load control according to the present embodiment (object interval) is included (current day) is traded on these markets. The forward market and the bulletin board market close several days before the current day, and the trading prices are finalized. The day ahead market closes at 10 o'clock AM on the previous day from the day that is the object of control, and the trading prices are finalized. On the hourly-ahead market, trading is conducted up to one hour before the object interval of the current day. This hourly-ahead market is a market that is primarily used for adjusting power generation and demand. Accordingly, in the present embodiment, the power amount charge unit prices for each interval of the current day, and the contents of load control to be executed, are finalized prior to starting control of the facility equipment 200 on the current day, on the basis of trading results on the forward market, the bulletin board market, and the day ahead market, (spot market), as a basic rule.

Note that here, power amount charge unit prices and the contents of load control are finalized on the basis of trading prices on markets other than the hourly-ahead market. Conversely, in a case in which it is certain that power can be procured at more advantageous unit price conditions on the hourly-ahead market following finalization of power amount charge unit prices and control contents, the power amount charge unit prices and the contents of load control with respect to the facility equipment 200 may be changed on the basis of trading prices on the hourly-ahead market.

While an embodiment is described above, the technical scope of the present disclosure is not limited to the above embodiment. For example, although description is made in the above embodiment that the power amount charge unit prices fluctuate in increments of intervals, the length of time of the power amount charge unit prices fluctuating may be a length other than intervals. Also, although adjustment control is described as being performed in intervals immediately following intervals that are the object of suppression control in the above embodiment, this is not limited to immediately following, and a later interval after the interval that is the object of suppression control may be the object of adjustment control. Moreover, various modifications and substitutions of configuration that do not depart from the scope of the technical spirit of the present disclosure are encompassed by the present disclosure.

Now, the embodiment described above can be understood as follows. A generating device according to the present disclosure is a control device 100 serving as a generating device that generates control information for controlling facility equipment 200 of a consumer, and includes an information acquisition unit 110 that acquires information of a power amount charge unit price that fluctuates and information of power usage of the consumer, and a control information generating unit 130 that, on the basis of the power amount charge unit price in an object interval that is an interval in which control of the facility equipment 200 is performed and information of power usage of the consumer in an interval after the object interval, generates control information for the facility equipment 200 of the consumer in the object interval.

Thus, the facility equipment 200 can be controlled so as to reduce electricity charges on the basis of fluctuation in the power amount charge unit price, and also a relation between the prediction value of power usage and a greatest value in a relevant period.

Now, the control information generating unit 130 may generate the control information to control the facility equipment 200 so as to suppress power usage in the object interval in a case in which the power amount charge unit price in the object interval satisfies a predetermined condition.

Thus, control can be performed to reduce electricity charges by suppressing power usage of the consumer, on the basis of fluctuation in the power amount charge unit price, and also a relation between the prediction value of power usage and a greatest value in a relevant period.

Also, the control information generating unit 130 may not generate the control information to control the facility equipment 200 so as to suppress power usage in the object interval in a case in which the power usage of the consumer in an interval after the object interval is expected to exceed a reference power, even in a case in which the power amount charge unit price in the object interval satisfies the predetermined condition.

Thus, a situation can be avoided from in which the power usage of the consumer exceeds the reference power in an interval after the object interval due to controlling the facility equipment 200 so as to suppress power usage in the object interval.

Also, in a case in which the power usage of the consumer in an interval after the object interval is expected to exceed a reference power and in which the power amount charge unit price in an interval immediately prior to the object interval is no greater than a reference unit price, the control information generating unit 130 may generate control information to implement preliminary operation of the facility equipment 200 in the interval immediately prior to the object interval.

Thus, the power usage of the facility equipment 200 in the object interval can be reduced, even in a case in which controlling the facility equipment 200 so as to suppress power usage in the object interval will cause the power usage of the consumer to exceed the reference power in an interval after the object interval.

Also, with regard to air conditioning equipment included in the facility equipment 200, the control information generating unit 130 may generate control information to implement preliminary cooling operation or preliminary heating operation in an interval immediately prior to the object interval, in accordance with operation to be implemented in an interval next after the object interval.

Thus, in an air conditioner, power usage of the air conditioner in the object interval can be reduced, even in a case in which performing control so as to suppress power usage in the object interval will cause the power usage of the consumer to exceed the reference power in an interval after the object interval.

Also, the information acquisition unit 110 may acquire information of a contract charge unit price, which is used in conjunction with information of greatest demand power of the consumer to set a base fee, and the control information generating unit 130 may generate the control information on the basis of an electricity charge of the consumer over a certain period, which is determined from the power amount charge unit price, information of power usage of the consumer, and the contract charge unit price.

Thus, the facility equipment 200 can be controlled to reduce the electricity charge of the consumer over the certain period.

Also, a system according to the present disclosure includes a control device 100 serving as a generating device that generates control information for controlling facility equipment 200 of a consumer, and facility equipment 200 that accepts the control information generated by the control device 100 and performs action. The control device 100 includes an information acquisition unit 110 that acquires information of a power amount charge unit price that fluctuates and information of power usage of the consumer, and a control information generating unit that, on the basis of the power amount charge unit price in an object interval that is an interval in which control of the facility equipment 200 is performed and information of power usage of the consumer in an interval after the object interval, generates control information for the facility equipment 200 of the consumer in the object interval.

Thus, the facility equipment 200 can be controlled so as to reduce electricity charges on the basis of fluctuation in the power amount charge unit price, and also a relation between the prediction value of power usage and a greatest value in a relevant period.

Also, a program according to the present disclosure causes a computer to function as power amount charge information acquisition section that acquires information of a power amount charge unit price that fluctuates, power usage information acquisition section that acquires information of power usage of a consumer, and control information generating section that, on the basis of the power amount charge unit price in an object interval that is an interval in which control of the facility equipment 200 of the consumer is performed and information of power usage of the consumer in an interval after the object interval, generates control information for the facility equipment 200 of the consumer in the object interval.

Thus, according to the computer in which this program is installed, the facility equipment 200 can be controlled so as to reduce electricity charges on the basis of fluctuation in the power amount charge unit price, and also a relation between the prediction value of power usage and a greatest value in a relevant period.

REFERENCE SIGNS LIST 100 control device
110 information acquisition unit 120 storage unit
130 control information generating unit
140 output unit
200 facility equipment
210 accepting unit
220 action control unit
230 output unit

The invention claimed is:

1. A generating device that generates control information for controlling facility equipment of a consumer, the generating device comprising:
a processor and a storage storing a program that causes the processor to,
acquire information of a power amount charge unit price that fluctuates;
acquire information of predicted power usage of the consumer;
on a basis of the power amount charge unit price in an object interval that is an interval in which control of the facility equipment is performed and information of entire predicted power usage of sets of facility equipment of the consumer in an interval after the object interval, generate control information for the facility equipment of the consumer in the object interval, the object interval being an interval during operation of the sets of facility equipment; and
transmit the generated control information to the facility equipment,
wherein, the program causes the processor to perform a suppression control when the power amount charge unit price is higher in an interval before the object interval, and the program terminates the suppression control when the suppression control causes the power usage during the object interval to exceed the contract demand,
wherein the program causes the processor to determine whether the power usage of the consumer after load control in an interval after the object interval is expected to exceed a contract demand, which is a largest value of a largest demand power within a past year from a current month, and generate the control information to control the facility equipment so as to suppress power usage in the object interval only in a case in which the power amount charge unit price in the object interval satisfies a predetermined condition and the determined power usage of the consumer after load control in the interval after the object interval is not expected to exceed the contract demand, and
wherein, the facility equipment, based on the control information, reduces power usage during the object interval below the contract demand, and increases the power usage during the interval after the object interval while maintaining the power usage below the contract demand to maintain an average power usage below the contract demand.

2. The generating device according to claim 1, wherein, in a case in which the power usage of the consumer in an interval after the object interval is expected to exceed a reference power and in which the power amount charge unit price in an interval immediately prior to the object interval is no greater than the contract demand unit price, the program causes the processor to generate control information to implement preliminary operation of the facility equipment in the interval immediately prior to the object interval.

3. The generating device according to claim 2, wherein, with regard to air conditioning equipment included in the facility equipment, the program causes the processor to generate control information to implement preliminary cooling operation or preliminary heating operation in an interval immediately prior to the object interval, in accordance with operation to be implemented in an interval next after the object interval.

4. The generating device according to claim 1, wherein the program further causes the processor to:
acquire information of a contract charge unit price, which is used in conjunction with information of greatest demand power of the consumer to set a base foe, and
generate the control information on a basis of an electricity charge of the consumer over a certain period, which is determined from the power amount charge unit price, information of the predicted power usage of the consumer, and the contract charge unit price.

5. A system, comprising:
a processor and a storage storing a program that causes the processor to,
generate control information for controlling facility equipment of a consumer;
the system including facility equipment that accepts the control information generated in the generate step and performs action,
in the generate step, the program further causes the processor to,
acquire information of a power amount charge unit price that fluctuates,
acquire information of predicted power usage of the consumer,
on a basis of the power amount charge unit price in an object interval that is an interval in which control of the facility equipment is performed and information of entire predicted power usage of sets of facility equipment of the consumer in an interval after the object interval, generate control information for the facility equipment of the consumer in the object interval, the object interval being an interval during operation of the sets of facility equipment; and
transmit the generated control information to the facility equipment,
wherein, the program causes the processor to perform a suppression when the power amount charge unit price is higher in an interval before the object interval, and the program terminates the suppression control when the suppression control causes the power usage during the object interval to exceed the contract demand,
wherein the program causes the processor to determine whether the power usage of the consumer after load control in an interval after the object interval is expected to exceed a contract demand, which is a largest value of a largest demand power within a past year from a current month, and generate the control information to control the facility equipment so as to suppress power usage in the object interval only in a case in which the power amount charge unit price in the object interval satisfies a predetermined condition and the determined power usage of the consumer after load control in the interval after the object interval is not expected to exceed the contract demand, and
wherein, the facility equipment, based on the control information, reduces power usage during the object interval below the contract demand, and increases the power usage during the interval after the object interval while maintaining the power usage below the contract demand to maintain an average power usage below the contract demand.

6. A non-transitory computer readable medium storing a program that causes a computer to:
- acquire information of a power amount charge unit price that fluctuates;
- acquire information of predicted power usage of a consumer; and
- on a basis of the power amount charge unit price in an object interval that is an interval in which control of the facility equipment of the consumer is performed and information of entire predicted power usage of sets of facility equipment of the consumer in an interval after the object interval, generate control information for the facility equipment of the consumer in the object interval the object interval being an interval during operation of the sets of facility equipment, and
- transmit the generated control information to the facility equipment,
- wherein, the program causes the processor to perform a suppression control when the power amount charge unit price is higher in an interval before the object interval, and the program terminates the suppression control when the suppression control causes the power usage during the object interval to exceed the contract demand,
- wherein the program causes the computer to determine whether the power usage of the consumer after load control in an interval after the object interval is expected to exceed a contract demand, which is a largest value of a largest demand power within a past year from a current month, and generate the control information to control the facility equipment so as to suppress power usage in the object interval only in a case in which the power amount charge unit price in the object interval satisfies a predetermined condition and the determined power usage of the consumer after load control in the interval after the object interval is not expected to exceed the contract demand, and
- wherein, the facility equipment, based on the control information, reduces power usage during the object interval below the contract demand, and increases the power usage during the interval after the object interval while maintaining the power usage below the contract demand to maintain an average power usage below the contract demand.

* * * * *